March 14, 1933.   R. A. FESSENDEN   1,901,502
LIGHT MODULATOR AND METHOD OF CONSTRUCTING THE SAME Original Filed Aug. 21, 1922

*Inventor*
Reginald A. Fessenden
by Ezekiel Wolf
His Attorney.

Patented Mar. 14, 1933

1,901,502

UNITED STATES PATENT OFFICE

REGINALD A. FESSENDEN, OF CHESTNUT HILL, MASSACHUSETTS

LIGHT MODULATOR AND METHOD OF CONSTRUCTING THE SAME

Original application filed August 21, 1922, Serial No. 583,271. Divided and this application filed January 8, 1927. Serial No. 159,940.

My invention relates to the transmission of energy, and still more particularly of signals and pictures and moving pictures, by high frequency impulses, and more particularly by high frequency currents, and still more particularly by Hertzian waves; and to the elimination of the disturbing effect of atmospheric and other injurious influences; and to the reduction of the cost and uncertainty of transmission.

This application is a division of my application Serial No. 583,271, filed August 21, 1922, on which Patent No. 1,617,241, was issued February 8, 1927.

It has for its object the accomplishment of such of the subjects to which it relates which have not heretofore been accomplished; and increased efficiency and simplicity and reliability and economy in such as have been accomplished.

Figure 1:
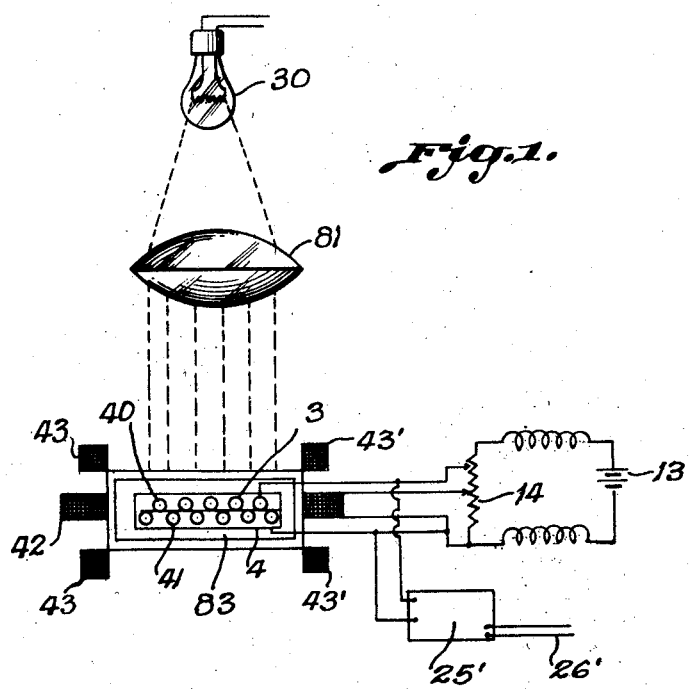
Figure 2:
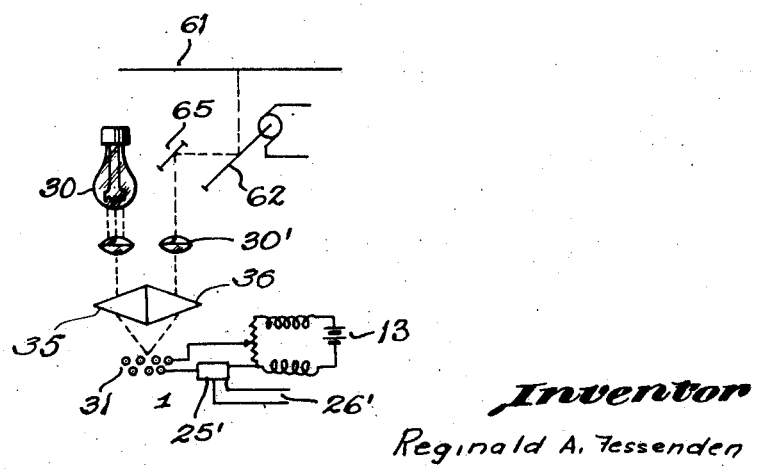

The invention will be more clearly understood by reference to the drawing in which Figure 1 shows the light modulator partly in section and the electrical operating circuit connected therewith, and Figure 2 shows schematically the operation of the system including the light modulator of Figure 1.

The light cell or modulator is preferably constructed of straight gold wire, one ten thousandth of an inch in diameter, wire of this size having been drawn by me and found suitable and reliable. The wires may be surrounded by a water jacket containing heat opaque, and visually transparent fluid to give any desired spectral characteristics, or they may be cooled by being positioned in a gaseous medium such as hydrogen. The sensitivity of the light modulator is controlled by the amount of local battery current from the battery 13 which is regulated by the potentiometer 14 connected across the battery.

This modulated current is received at the reproducing station 1 over wires 26' from the sending station, and there employed to reproduce the picture, or the scene which is going on, at the sending end, for example a photograph, or a baseball game, or a scene from an opera.

Even with the somewhat crude apparatus, and insufficient amplification employed by applicant, applicant has succeeded in cutting down the time of modulation and reproduction of a transmitted image per single image area to one fifty thousandth of a second. Allowing five repetitions per second for persistence of vision, it will be seen that this gives 10,000 (ten thousand) small picture areas for the field of the picture, or, allowing fifty areas per linear inch, at ten inches focus, (the usual process print definition,) this gives a picture ten feet square on the movie screen at the reproducing end, at a distance of fifty feet, which is sufficient for substantially all practical purposes. And applicant's tests have shown that with increased amplification and with more carefully constructed apparatus, there is no difficulty in obtaining 250,000 picture areas per second, with a corresponding increase in reproduced image area.

It will be noted that the smallest object which can be seen by the human eye subtends an angle of one minute of arc, which at the normal focal distance of ten inches, is 1/300 inch diameter, and that this is in a stationary field and not a moving one, and with perfect contrast. In process prints, where the field is fixed but the contrast is not perfect, as it is in a line drawing in black and white, areas as large as 1/50 inch in diameter are found to give very satisfactory results. Where the picture is a moving one, even larger areas are found satisfactory.

In addition, with applicant's arrangement the definition is very much improved over the process print for the reason that while the invention may be used to transmit and reproduce a succession of dicontinuous picture areas, or dots of varying darkness, as described in applicant's U. S. Patent 1,015,-881, Dec. 19, 1906, but by means of a different invention, yet it may be, and as shown is preferably used to transmit by continuously modulating the transmitting impulses. This continuous modulation of the transmitted impulses in accordance with the varying intensities of successive small picture areas gives much more satisfactory optical effect.

In Figure 2, the light modulations are continually projected upon the screen 61 by means of the synchronized system of rotating mirrors, 65 and 62. The light from the projector source 30, is modulated by the shutter 31 as about to be explained by means of the received energy, received by the circuit 26' and suitably impressed through the receiving, detecting, or amplifying circuit 25' on the shutter circuit.

In Figure 2 the projector 30 is preferably a continuous current arc lamp projector or a pointolight projector, and I have found that an alternating current does not give good results except when used with a tungsten or similar type of incandescent lamp, and at high frequencies of the order of 10,000 per second or more.

The device or light modulator 31 for modulating the projected light in accordance with the received modulated impulses is shown in detail in Figure 1. It consists of a form of shutter which applicant has tested up to speeds of 1/200,000 (one two hundred thousandth) of a second, using only a few micro-amperes of current.

As shown in Figure 1, and in U. S. Patent 1,172,018 in part, two rows of fine wires are placed with the spaces between the wires of one row opposite to the wires of the other row, so that when placed in the path of the projector beam no light, or only a predetermined amount, can pass through, the grids 40, 41 being placed in the magnetic field of the coil 42, (a permanent magnetic field may be used if desired,) so that when a current is passed through the wires of the grids the wires of each grid will move in opposite directions and let the light through. If this current is the light modulated current from the transmitting station the amount of light let through will correspond to the illumination of the succession of small picture areas at the transmitting or observing station.

A predetermined amount of light may be allowed to pass through the shutter in the absence of, or independent of, the modulating current, by passing an auxiliary direct current or alternating current through the wires of the grids; and by adjusting the current as shown in the magnetizing coil 42; and by tilting the grids sideways to each other.

When the light from the projector strikes the grids, the wires expand, and to take the slack out of the wires, an additional magnetic field, generated by the coils 43, 43' is used, which taughtens the wires without disturbing their alignment; in fact making it more stable. The wires become taut because they are in a magnetic field and under such circumstances tending to cut as few lines of force as possible follow the direction of the field and have a tendency to return to such a position if another force tends to disturb them. They are therefore made taut and have little slack that is little tendency to remain in the position other than their natural one.

The wires may be of any suitable size. Applicant has used wires as small as 1/10,000 inch and as large as 1/1,000 in. They can be left bright or lightly silver plated and dipped in sodium sulphite to blacken them, after mounting. I prefer to draw the wire with the silver sheath half the thickness of the gold core, wind the wire on two grid frames 3 and 4 placed back to back, with the silver sheaths touching, solder the wires, or spot weld them, to the frames, cut the two frames apart, and dissolve the wire sheaths with the apparatus known in the art.

The usual heat screen may be used between projector and shutter, and the grids may be in a chamber filled with hydrogen or in a vacuum.

In Figure 2 the beam of the source of light 30 or projector after passing through the prism 35 is reflected by the shutter 31 which modulates the beam and passing through the prism 36 to the mirror 65 and by means of the mirror system including mirrors 65 and 62 which are rotated in synchronism each light square is reflected on the screen 61.

The grating shutter type of cratophote or light modulator has certain advantages; for example, it is so sensitive that it may be used, where the movie screen is small and mounted on the arm of a chair or a desk, without amplification at the receiving end, and also without the use of a carrier current in the transmission line or wireless antenna. A few microamperes of current are sufficient to operate it. It operates very reliably up to frequencies of alternation of 200,000 per second, and without doubt up to 1,000,000 per second, though 200,000 per second is all that applicant has actually used to date. It is easily adjusted electrically, so as to let any predetermined amount of light through in the absence of the modulating current. All natural period of vibration may be eliminated by the method shown in applicant's U. S. Patent 1,319,521, June 8th, 1917. The range and overload capacity are much greater than any other known instrument, as with wire of gold and 1/10,000 inch diameter an indication is produced with 1/100,000,000 ampere of current, but it will carry 1/1000 ampere safely, i. e. a ratio of 1 to 100,000 in current or 1 to 10,000,000,000 in energy. It also lends itself readily to mechanical and electrical heterodyning.

A further important advantage of this form of shutter, when used in this connection, is the fact that the light transmitted through the shutter is a multiple valued function of the current; for as the current increases the wires of the two grids are brought in line, one behind the other, and the light passed is then a maximum. If the current be still further increased, the wires begin to pass each other, shutting off the light, more and more, until the wires of one grid are now opposite the spaces of the other grid, and the light is a minimum. If the current be still further increased, the light passed increases again, and reaches a second maximum, and so on. This multiple valued relation of impulse to effect has the very important and hitherto unsuspected property that it greatly diminishes, in fact practically eliminates, all injuries or disturbing effects.

While the grid galvanometer shown in applicant's U. S. Patent 1,172,018, March 14th, 1908, is not adapted for use as a wireless receiver, by reason of the wires being made resonant to a natural period, and the field being a continuous current one, and other reasons, and has not therefore been so used, the grid arrangement shown in Fig. 1 and herein claimed, is well adapted, as applicant has discovered, for this purpose. It is also well adapted for heterodyning, by passing a high frequency current through the magnetizing coil 42. This new type of grid galvanometer receiver has the great advantage that it substantially eliminates the effect of atmospheric disturbances for the reasons mentioned above in connection with the effect of atmospheric disturbances on picture transmission; in contradistinction to the earlier type vibrating at a natural period, which gave the same type of indication on receipt of an atmospheric disturbance as on receipt of a signal, the present type, being dead beat, gives a small and easily distinguishable effect. It is not necessary that both sets of grid wires should move, or move in opposite directions when used for the methods herein described.

The grid receiver shown in Fig. 1 is especially suited to transmit speech on account of its freedom from disturbance by atmospheric disturbances, when acting as a wireless receiver. The atmospheric disturbances can never reach above a certain intensity, and the speech is always superimposed upon this, and the change of phase or reversal of the speech frequencies, due to the phenomenon referred to in connection with the transmission of pictures, does not affect the speech appreciably.

The effect of atmospheric or disturbing signals is, whether rectifier or heterodyne, or plain receiver without either is used, (see applicant's U. S. application Ser. No. 461,752) to change the phase of the received signal, and in some cases, to introduce a higher harmonic. A strong static discharge will make the wires of one grid pass by five or ten wires of the other grid, but no matter what their position they will operate to modulate the light or heat from the projector at the frequency of the signals, or a multiple thereof.

By radiant images is meant images formed by visible or invisible radiation, e. g. by light, heat or ultra-violet rays or other radiations.

By variable traction controller is meant a controller actuated by apparatus and methods of the general character of those shown in applicant's Patent 1,044,637, July 14, 1905 and 1,045,781, June 16th, 1908.

What I claim is:—

1. In the art of transmitting radiant images or vision, a light modulator having a plurality of sections formed of reflecting conducting material and electrical means to vary the total area of reflection by linear motion of the sections.

2. In the art of transmitting radiant images or vision, a light modulator having at least two groups of sections formed of reflecting conducting material and electric means to vary the total area of reflection by linear motion of the sections of each group in opposite directions.

3. In the art of transmitting radiant images or vision, a method of constructing a light modulator which comprises arranging abutting one another elements having a removable coating of one half the desired thickness of the ultimately desired space between elements of the light modulator, and then removing the coating after the elements have been fixed in position.

4. In the art of transmitting radiant images or vision, a method of constructing a light modulator which comprises arranging abutting one another current conducting elements having a removable coating of one half the desired thickness of the ultimately desired space between elements of the light modulator, and then removing the coating after the elements have been fixed in position.

5. In the art of transmitting radiant images or vision, a method of constructing a light modulator which comprises arranging abutting one another gold silver plated conducting filaments, the thickness of the silver plating being one half the thickness of the ultimately desired space between the elements of the light modulator, and then removing the silver coating after the elements have been fixed in position.

6. In the art of transmitting radiant images or vision, a light modulator comprising a row of substantially parallel conducting elements in a magnetic field and a second magnetic field running normal to the first for adjusting the tension on the conducting elements.

7. In the art of transmitting radiant images or vision, a light modulator comprising a plurality of rows of substantially parallel conducting elements in a magnetic field and a second magnetic field running normal to the first for adjusting the tension on the conducting elements.

8. In the art of transmitting radiant images or vision, a light modulator comprising a plurality of substantially parallel conducting elements in a magnetic field and means for initially impressing a desired current upon the conducting elements to allow the desired amount of light to pass through the light modulator.

9. A light modulator comprising a source of light, a plurality of elements having reflecting surfaces adapted to reflect said light, means positioning said elements in groups in parallel planes, and means for moving the elements relative to one another to vary the reflecting area of said modulator.

10. A light modulator comprising a source of light, a plurality of current conducting elements positioned in an electric field, means for positioning said elements with respect to one another for varying their total reflecting area in accordance with current variations in the conducting elements.

11. A light modulator comprising means for modulating the light of a light source in accordance with modulating energy acting upon said means, and means for maintaining said first means cool, comprising a chamber containing a gas lighter than air associated with said first means.

12. A light modulator comprising means for modulating the light of a light source in accordance with modulating energy acting upon said means, and means for maintaining said first means cool, comprising a chamber containing hydrogen in which said first means is positioned.

REGINALD A. FESSENDEN.